(No Model.) 2 Sheets—Sheet 1.

J. KROOG.
FILTER PRESS FOR USE IN PRODUCING HOMOGENEOUS CAKES.

No. 370,742. Patented Sept. 27, 1887.

Witnesses
J. A. Rutherford
Robert Everett

Inventor:
Johann Kroog,
By James L. Norris.
Atty.

N. PETERS, Photo-Lithographer, Washington, D. C.

(No Model.) 2 Sheets—Sheet 2.

J. KROOG.
FILTER PRESS FOR USE IN PRODUCING HOMOGENEOUS CAKES.

No. 370,742. Patented Sept. 27, 1887.

Witnesses
J. A. Rutherford
Robert Everett

Inventor
Johann Kroog,
By James L. Norris
Atty.

UNITED STATES PATENT OFFICE.

JOHANN KROOG, OF HALLE-ON-THE-SAALE, PRUSSIA, GERMANY.

FILTER-PRESS FOR USE IN PRODUCING HOMOGENEOUS CAKES.

SPECIFICATION forming part of Letters Patent No. 370,742, dated September 27, 1887.

Application filed March 16, 1887. Serial No. 231,152. (No model.) Patented in Germany August 28, 1884, No. 30,921; in France September 15, 1884, No. 164,284; in England September 17, 1884, No. 12,520; in Austria-Hungary February 6, 1885, No. 34,163 and No. 5,850, and in Belgium February 13, 1885, No. 67,857.

*To all whom it may concern:*

Be it known that I, JOHANN KROOG, of the city of Halle-on-the-Saale, in the Kingdom of Prussia and German Empire, have invented a certain new and useful Improvement in Filter-Presses Intended for Use in Producing Homogeneous Cakes, (for which I have obtained patents in Germany, dated August 28, 1884, No. 30,921; France, dated September 15, 1884, No. 164,284; England, dated September 17, 1884, No. 12,520; Austria-Hungary, dated February 6, 1885, No. 34,163 and No. 5,850, and Belgium, dated February 13, 1885, No. 67,857,) of which the following is a specification, reference being had to the accompanying drawings, and to the letters of reference marked thereon.

This invention relates to improvements in filter-presses intended for use in producing homogeneous cakes.

If out of a mixture of liquid and solid substances the latter are to be obtained in the shape of cakes, the difficulty often arises that the said cakes thus obtained are not homogeneous in all their parts, and that the upper parts of the said cakes are softer or less compact than the lower parts of the same. This difficulty being of great importance under all circumstances, it will become the more so in all such cases where the cakes obtained by means of filtration are to be subjected to a further treatment by subjecting them to the action of some liquid or fluid while yet in the filter-press.

The object of my invention is to avoid the objections stated, which I accomplish by the features of construction and combination of devices hereinafter described and claimed, reference being made to the accompanying drawings, in which—

Figure 1:
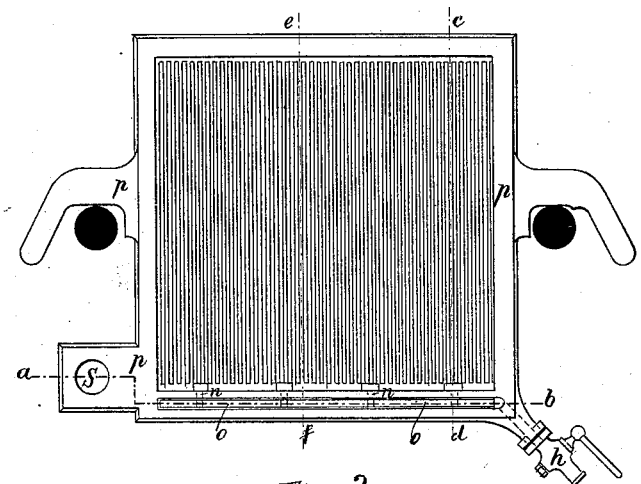
Figure 2:
Figure 3:
Figure 4:
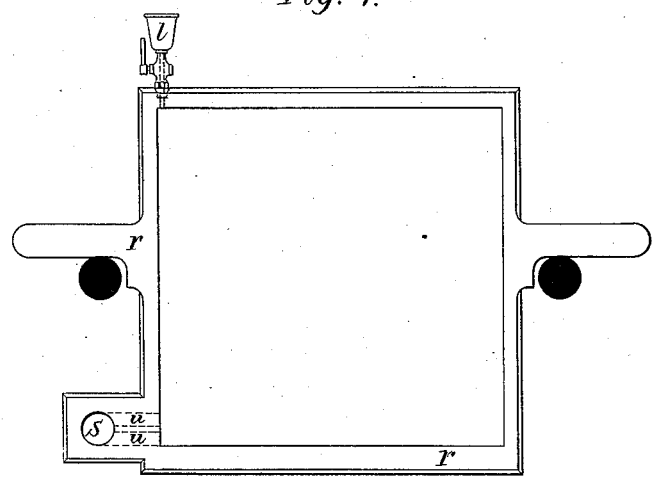
Figure 5:
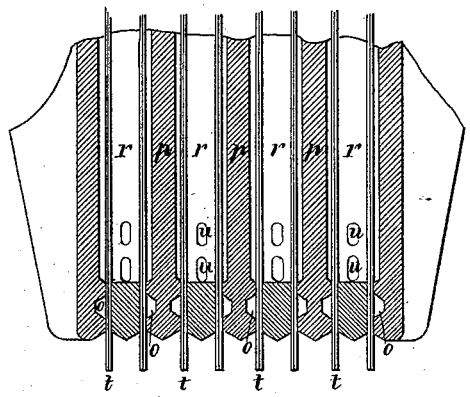
Figure 6:
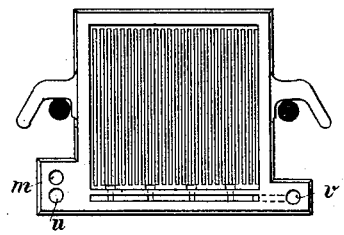
Figure 7:
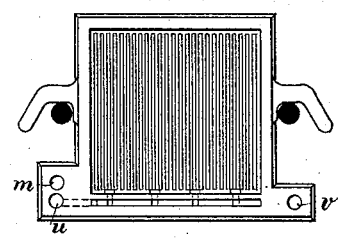
Figure 8:
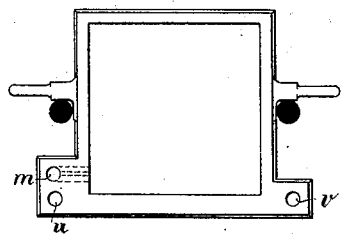

Figure 1 is a filtering-plate provided with fine vertical grooves. Fig. 2 is a horizontal section of the same on the line *a b*. Fig. 3 is a vertical section of the same on the line *c d*, and of the filter-frame shown in Fig. 4. Fig. 4 is an elevation of the said filter-frame. Fig. 5 is a transverse section, drawn to an enlarged scale, of a number of plates and frames, showing the order of the latter and the position of the channels or passages in the joining-flanges of the said plates. Figs. 6 and 7 illustrate a modified form of a filtering-plate, and Fig. 8 is an elevation of the frame for the same.

In Figs. 1 to 5, inclusive, S indicates the transverse channel or passage for the said mixture of substances; *u u*, the inlets for the said mixture from the passage S into the interior of the frame *r*, and *l* the stop-cock of the air-pipe, having a suitable basin or receptacle arranged upon the upper part of the said frame.

I wish it to be understood that I am aware of the fact that filtering-plates provided with fine grooves are old, and that they have been applied for the reason that they offered advantages as compared with the filtering-plates covered with perforated sheet metal by reason of their larger filtering area. Yet notwithstanding these advantages they have been but seldom used, partly on account of the difficulty met with in their manufacture and partly because they were liable to burst on increasing but inconsiderably the pressure or temperature by reason of the channel or passage cast into their lower part, and by reason of the circumstance that the connection between their lower rims and their central parts was established by nothing else except by the thin ribs between their said grooves. Besides, the cleansing of the said passage cast into the said plates was most difficult. All these difficulties are obviated by the plates constructed in accordance with the principles of my present invention. With the plates of my said improved construction the liquid filtered is educted from the said grooves by means of small conduits *n*, arranged vertically in any convenient number near the lower side of the said plates, and enters the lateral passages or channels *o*, countersunk into both sides of the joining-flanges of the said filtering-plates, whence the said liquid will flow off through the cock *h*, provided near one corner of each plate. The filtering-cloth *t* extends beyond the said lateral channel *o* and also beyond the lower rim of the plate *p* and frame *r*.

It is evident that by the construction described a most perfect eduction of the filtered liquid from the said vertical grooves is obtained, and that consequently the cakes in the said frames will be formed so as to be perfectly uniform, and that, furthermore, the said plates offer no difficulty in their manufacture and cannot burst.

Now, in order to entirely secure the uniformity in the formation of the cakes from the very beginning, it is necessary to have all the frames $r$ filled completely at the beginning of the filtering process. This condition is arrived at by the use of the stop-cock $l$ of the said air-pipe arranged upon the frames $r$, and by means of the following method or mode of working—that is to say, the outlet-cocks $h$ being closed and the air-cocks $l$ opened, the liquid and solid substances are admitted at S, from whence they pass into the frames $r$ through the conduits $u$ $u$. (See Fig. 4.) The said mixture on entering the frames $r$ will expel therefrom the air, which will leave through the opened air-cocks $l$, and this will continue until it will be noticed from the appearance of the upper part of the said mixture of substances in the said basins above the air-cocks that the charge of the frames $r$ is completed. The entrance of the liquid and solid substances through the passage S is now stopped by any suitable means, whereupon the air-cocks $l$ will be closed, and, this being done, the outlet-cocks $h$ of the plates $p$ are opened. The liquid and solid substances are now again admitted by passage S and conduits $u$ into the frames $r$. The filtration, which could not take place before, (by reason of the opened air-cocks $l$,) now commences, and the formation of entirely homogeneous cakes will take place because the filtered liquid can readily flow off from all the spaces of the said grooves in the plates $p$, and for the reason that the frames $r$ were completely filled at the beginning of the filtering process, so that no air could influence the said formation of the cakes with any noxious effect. The small quantities of the mixed substances having remained in the basins of the air-cocks $l$ on closing the same, will escape on opening the said cocks before the commencement of a fresh filtering process into the then emptied frames $r$.

In the modified arrangement illustrated in Figs. 6, 7, and 8 of the drawings the said outlet-cocks $h$ are substituted by the channels $v$ and $u$, while the inlet-passage for the mixture of solid and liquid substances is indicated by the letter $m$.

Having thus described my invention, what I claim as new, and desire to secure by Letters Patent, is—

1. A filtering-plate vertically grooved in its opposite sides, and provided at its lower portion with a transverse inlet-passage and countersunk opposite longitudinal side channels, $o$, communicating at one end with an outlet, said plate having the series of vertical conduits $n$, connecting the lower ends of both grooved sides of the plate with both of said countersunk longitudinal side channels, substantially as described.

2. The grooved filtering-plates having the lateral channels $o$ in the opposite sides of the joining-flanges, and provided with the outlets at their bottom, and the air-cocks $l$, having a basin or receptacle, in combination with the filtering-frames $r$ between said grooved plate, substantially as and for the purposes described.

In testimony whereof I have signed my name to this specification in the presence of two subscribing witnesses.

JOHANN KROOG.

Witnesses:
A. D'HEUREUSE,
EMIL WOLF.